(12) United States Patent
Rodriguez-Rivera et al.

(10) Patent No.: US 7,051,056 B2
(45) Date of Patent: May 23, 2006

(54) CONSERVATIVE GARBAGE COLLECTORS THAT CAN BE USED WITH GENERAL MEMORY ALLOCATORS

(75) Inventors: Gustavo Rodriguez-Rivera, West Lafayette, IN (US); Michael P. Spertus, Chicago, IL (US); Charles Fiterman, Deerfield, IL (US)

(73) Assignee: VERITAS Operating Corporation, Mountain View, CA (US)

( * ) Notice: Subject to any disclaimer, the term of this patent is extended or adjusted under 35 U.S.C. 154(b) by 354 days.

(21) Appl. No.: 10/362,250

(22) PCT Filed: Sep. 13, 2001

(86) PCT No.: PCT/US01/28787

§ 371 (c)(1),
(2), (4) Date: Feb. 20, 2003

(87) PCT Pub. No.: WO02/23345

PCT Pub. Date: Mar. 21, 2002

(65) Prior Publication Data

US 2004/0139272 A1 Jul. 15, 2004

Related U.S. Application Data

(60) Provisional application No. 60/232,205, filed on Sep. 13, 2000.

(51) Int. Cl.
*G06F 17/30* (2006.01)
(52) U.S. Cl. .......................................... 707/206; 707/10
(58) Field of Classification Search ............. 707/1–10, 707/100–104.1, 200–206; 711/100, 202
See application file for complete search history.

(56) References Cited

U.S. PATENT DOCUMENTS

| 5,845,298 | A | 12/1998 | O'Connor et al. |
| 5,848,423 | A | 12/1998 | Ebrahim et al. |
| 5,873,105 | A | 2/1999 | Tremblay et al. |
| 5,900,001 | A | 5/1999 | Wolczko et al. |
| 6,055,612 | A | 4/2000 | Spertus et al. |
| 6,065,020 | A | 5/2000 | Dussud |
| 6,098,089 | A | 8/2000 | O'Connor et al. |

(Continued)

OTHER PUBLICATIONS

"A Memory Allocator," Doug Lea, Apr. 2000, (http:gee.cs.oswego.edu/dl/html/malloc.html).

(Continued)

*Primary Examiner*—Mohammad Ali
(74) *Attorney, Agent, or Firm*—Meyertons Hood Kivlin Kowert & Goetzel, P.C.; B. Noël Kivlin

(57) ABSTRACT

A memory manager comprises a memory allocator and a garbage collector. The memory allocator is configured to allocate memory for objects within a heap on behalf of a process, generate a heap map comprising a plurality of heap map entries, wherein each heap map entry of the plurality of heap map entries includes an address of an object allocated within the heap, and provide the heap map to the garbage collector. The garbage collector is configured to generate a mark list identifying one or more objects within the heap using the heap map, wherein the addresses of the one or more objects correspond to data values specified within an address space of the process, and to free a given object previously allocated in the heap if the mark list indicates that an address of the given object does not correspond to a data value specified within the address space.

33 Claims, 5 Drawing Sheets

U.S. PATENT DOCUMENTS

| | | | |
|---|---|---|---|
| 6,105,040 | A | 8/2000 | Agesen |
| 6,199,075 | B1 | 3/2001 | Ungar et al. |
| 6,209,066 | B1 | 3/2001 | Holzle et al. |
| 6,308,185 | B1 | 10/2001 | Grarup et al. |
| 6,584,478 | B1 | 6/2003 | Spertus |
| 6,804,765 | B1* | 10/2004 | Kolodner et al. ........... 711/202 |
| 2002/0194421 | A1* | 12/2002 | Berry et al. ................ 711/100 |

OTHER PUBLICATIONS

"Garbage Collection in an Uncooperative Environment," Boehm, et al., *Software Practice and Experience* 18, 9, pp. 807-820, 1988.

"The Memory Fragmentation Problem: Solved?," Johnstone, et al., *ISMM '98 Proceedings of the ACM SIGPLAN International Symposium on Memory Management*, pp. 26-36, Oct. 1998.

"A Non-Fragmenting Non-Moving, Garbage Collector," Rodriguez-Rivera, et al., *ISMM '98 Proceedings of the ACM SIGPLAN International Symposium on Memory Management*, pp. 79-85, Oct. 1998.

"A Memory Allocator" Doug Lea, Apr. 4, 2000, http://gee.cs.oswego.edu/dl/html/malloc.html.

* cited by examiner

CONSERVATIVE GARBAGE COLLECTORS THAT CAN BE USED WITH GENERAL MEMORY ALLOCATORS

CROSS REFERENCES TO RELATED APPLICATIONS

This patent application claims priority from U.S. Provisional Patent Application 60/232,205, M. Spertus, et al., Conservative garbage collection for general memory allocators, filed 13 Sep. 2000.

BACKGROUND OF THE INVENTION

1. Field of the Invention

The invention pertains to memory management in computer systems generally and pertains more particularly to management of memory that belongs to a process's heap.

2. Description of Related Art: FIG. 1

In a computer system, a given execution of the code for a program is performed by a process that runs on the computer system. Each process has its own address space, i.e., a range of addresses that are accessible only to the process, and the program's code and the data for the given execution are all contained in the process's address space. A process's address space exists only for the life of the process.

FIG. 1 shows a process address space 102 as it appears during execution of an application program 105 that is written in a language such as C or C++ which permits the programmer to explicitly allocate and free memory for the program in process address space 102. Process address space 122 is subdivided into a number of different areas. Program code 103 contains the code for the program. The code includes the code for application program 105 and other code that is invoked by application program 105; here, the only additional code shown is for allocator 111, which is library code that allocates and frees memory. Next comes static storage 117, which contains static data used by application program 105 and the library code that is executed by application program 105. Then comes stack 121, which contains storage for data belonging to each procedure currently being executed by program 105. Then comes unused address space 123. Finally, there is heap 125, which contains storage which is explicitly allocated and freed by statements in program 105 that invoke functions in allocator 111. The size of both stack 121 and heap 125 may increase and decrease during execution of application program 105; if address space 123 is completely consumed, the process cannot continue to execute application program 105 and the process is said to crash.

Continuing in more detail with application program 105 and allocator 111, allocator 111 includes a malloc function 113, which allocates blocks 127 in heap 125, and free function 115, which frees blocks in heap 125. Both of these functions are external, in the sense that they may be called by other code such as application program 105. This fact is indicated in FIG. 1 by the placement of the blocks representing the functions along one edge of the block representing the allocator. Allocator 111 maintains data structures including a free list 119 from which all of the free heap blocks 131 can be located; when the allocator allocates a block 127, it removes the block 127 from free list 119; when it frees the block, it returns the block 127 to free list 119. If there are no blocks 127 on free list 119, allocator 111 expands heap 125 into unused address space 123. Allocation is done in response to an invocation 107 of malloc function 113 in application program 105; the invocation specifies a size for the block and allocator 111 removes a block of that size from free list 119 and provides a pointer to the block to application program 105. A pointer is an item of data whose value is a location in the process's address space. Freeing is done in response to an invocation 109 of free function 115 in application program 105; the invocation provides a pointer to the block 127 to be freed and the free function uses the pointer to return the block to free list 119. Because application program 105 must explicitly allocate and free blocks in heap 131, application program 105 is said to employ explicit heap management. An example of a widely-used public domain allocator for explicit heap management is Doug Lea's allocator. It is described in the paper, Doug Lea, A memory allocator, which could be found in September, 2001 at http://gee.cs.oswego.edu/dl/html/malloc.html.

As is apparent from the foregoing, the programmer who writes application program 105 must take care to avoid two errors in managing heap 125:

freeing a heap block 127 before application program 105 is finished using it; and failing to free a heap block 127 after application program 105 is finished using it.

The first error is termed premature freeing, and if the application program references the block after it has been freed, the block may have contents that are different from those the program expects. The second error is termed a memory leak. If an allocated heap block 127 is not freed after the program is done using it, the allocated heap block 127 becomes garbage, that is, a heap block 127 that is no longer being used by application program 105, but has not been returned to free list 119, and is therefore not available for reuse by application program 105. If the process executing application program 105 runs long enough, the garbage that accumulates from a memory leak can consume all of unused address space 123, causing the process to crash. Even before a memory leak causes a process to crash, the garbage in heap 125 ties up resources in the computer system and degrades the performance of the process executing application program 105 and of other processes running on the computer system.

As application programs have grown in size and complexity, have been written and maintained by many different programmers over a span of years, and have been executed by processes that cease running only if the computer system they are running on fails, memory allocation errors such as memory leaks and premature frees have become an increasingly important problem. The larger and more complex a program is, the greater the chance that allocation errors will occur, particularly when a programmer working on one part of the program does not understand the conditions under which a heap block allocated by another part of the program may-be freed. When the program is used and modified by many different programmers over a period of many years, the risk of allocation errors increases further. In addition, if a program uses library routines provided by third parties such as vendors of operating systems, these library routines may contain allocation errors. Finally, the fact that programs which were developed for processes that only ran for a limited time are now being executed by processes that effectively "run forever" means that memory leaks which were formerly harmless now result in sluggish performance and crashes. Problems caused by allocation errors are moreover difficult to diagnose and fix; they are difficult to diagnose because the state of a process's heap is a consequence of the entire history of the given execution of the program represented by the process; consequently, the manner in which problems caused by allocation errors manifest themselves will vary from one process to another. They are difficult to fix because the invocation of the free function (or lack thereof) which is causing the problem may be in a part of the code which is apparently completely unrelated to the part which allocated the heap block.

A fundamental solution to the problem of allocation errors is to make heap management automatic. The programmer is still permitted to allocate blocks 127 in heap 125, but not to free them. The automatic heap management is done by garbage collector code which can be invoked from other code being executed by the process. A process with automatic heap management is shown at 133 in FIG. 1. Process address space 102 is as before, but allocator 111 has been replaced by garbage collector 139. Garbage collector 139 has an external malloc function 141 which is available to application program 135. Garbage collector 139 also has a free function 145, but free function 145 is an internal function that is not available to application program 135, as indicated by the location of free function 145 within garbage collector 139. Since only the malloc function is external, application program 135 contains invocations 137 of malloc function 141 but no invocations of free functions 145. The process periodically executes the garbage collector, and when executed, the garbage collector scans heap 125 for heap blocks 127 that are no longer being used by application program 105 and returns unused heap blocks 127 to free list 119.

When executed, garbage collector 139 determines which heap blocks 127 are no longer being used by the process by scanning pointers in the process's root data, that is, process data that is not contained in heap 125, for example, data in static data area 117, stack 121 and machine registers, and in allocated heap blocks 129 to see if the pointer being followed points to a heap block 127. If there are no pointers pointing to a given heap block 127, that heap block is not being used by the process and can be freed. Garbage collector 139 frees the unused block as described above: by invoking a free function that returns a pointer to the block to free list 119.

There are many different kinds of garbage collectors; for a general discussion, see Richard Jones and Rafael Lins, *Garbage collection, Algorithms for automatic dynamic memory management*, John Wiley and Sons, Chichester, UK, 1996. In the following we are concerned with conservative garbage collectors. For purposes of the present discussion, a conservative garbage collector is any garbage collector which does not require that pointers have forms which make them distinguishable from other kinds of data. Conservative garbage collectors can thus be used with programs written in languages such as C or C++ that do not give pointers forms that distinguish them from other data. These garbage collectors are conservative in the sense that they guarantee that they will not free a heap block that is being used by the process, but do not guarantee that allocated heap blocks 129 contains only blocks that are being used by the process.

Conservative garbage collectors include a marker function 143 which makes an in use table 120 that contains a list of the locations of all of the allocated heap blocks 129. Marker function 143 then scans the root data and allocated heap blocks 129 for data which has values that could be pointers into heap 105. When it finds such a value, it uses in use table 120 to determine whether the data points to a heap block; if it does and the heap block has not yet been marked as in use in table 120, marker function 143 marks the block in the table. When the scan is complete, the locations for all heap blocks that are in fact in use have been marked in in use table 120. The blocks 127 in table 120 that have not been marked are not being used by the process, and garbage collector 139 returns these blocks 127 to free list 119. A commercially-available example of a conservative garbage collector is the Great Circle® garbage collector manufactured by Geodesic Systems, Inc., 414 N. Orleans St., Suite 410, Chicago, Ill. 60610. Information about the Great Circle garbage collector can be obtained at the Geodesic Systems, Inc. Web site, geodesic.com The performance of a conservative garbage collector can be enhanced if the conservative garbage collector can reduce the number of heap blocks pointed to by false pointers. A false pointer is a value that the garbage collector takes to be a pointer to a heap block 127, but is in fact not really a pointer at all. As mentioned above, a conservative garbage collector treats every data value that can be interpreted as a pointer as such; for example, if the pointers in the computer system on which the process is running are aligned 32-bit values, the garbage collector will treat every aligned 32-bit value as a pointer. The problem with false pointers is that when an allocated heap block has a false pointer pointing to it, the false pointer will prevent the garbage collector from returning the block to the free list even though there are no (or no more) real pointers pointing to it.

One technique for reducing the number of heap blocks pointed to by false pointers is blacklisting. When the garbage collector detects a pointer that points to an area of the heap that does not presently contain allocated heap blocks, the pointer is clearly a false pointer. When the garbage collector detects such a pointer, it blacklists the block by adding it to a list of such blocks; this list is termed the blacklist. When the collector expands the heap into an area that contains blacklisted blocks, it uses the blacklist to determine what blacklisted blocks are in the area. The blacklisted blocks are not placed on the free list; consequently, only unblacklisted blocks are allocated, thereby reducing the chance that the block being allocated will not be able to be freed because of a false pointer. Like real pointers, false pointers may disappear as a result of changes in the process's storage; when a mark phase can no longer find any pointers that point to a blacklisted block, the garbage collector returns the blacklisted block to the free list in the sweep phase.

A problem with prior-art garbage collectors such as garbage collector 139 is that garbage collector 139 replaces allocator 111. That fact makes it difficult to retrofit garbage collector 139 to a program which was written for an allocator 111. A prior-art technique for retrofitting is employed in the Great Circle garbage collector. When an application program is to be executed with the Great Circle garbage collector, a library of programs that belong to the garbage collector is linked to the application program when the process that is executing the program begins running. The library of programs includes functions that manage heap 125, among them a malloc function and a free function that replace the malloc and free functions 113 and 115 of allocator 111. The replacement malloc function is identical to malloc function 141 of garbage collector 139; the replacement free function is a function which does nothing and returns; garbage collector 139 then uses its own internal free function as described above to return blocks 127 that are not being used by the process to free list 119.

Simply replacing an existing allocator 111 with heap management functions belonging to garbage collector 139 is undesirable whenever the replacement of the allocator with functions belonging to garbage collector 139 involves a substantial change or risk of substantial change in the behavior of the application program that uses the allocator 111. One such situation is with legacy programs that are known to work well with allocator 111, but where garbage collection would be desirable to deal with memory leaks caused by third-party library routines that are invoked by the application program. Such ancillary leaks are termed in the art litter, and the question for those responsible for maintaining the application program is whether the advantages of using garbage collector 139 for litter collection outweigh the risk of changing a known allocator 111. Another such situation is where the application program works better with the allocator it presently has than it will with the garbage collector's heap management functions. The application program may work better with the allocator it presently has either because the application program has been optimized for use with allocator 111 or a custom allocator has been optimized for use with the application program. In either case, replacing the allocator with the allocation functions of the garbage collector may result in substantial losses of efficiency, either with regard to speed of execution of the allocation functions or with regard to management of heap 125.

The undesirable effects of replacing an existing allocator 111 with heap management functions belonging to garbage collector 139 are a particular example of a general problem in the design of conservative garbage collectors: that the garbage collector not only determines what heap blocks 127 may be freed, but also performs the general heap management functions of an allocator. What is needed, and what is provided by the present invention is a conservative garbage collector which can use any existing allocator 111 to perform the heap management functions. Such a conservative garbage collector could be used with any application program, without risk of substantially affecting the application program's behavior. More fundamentally, the separation of the garbage collector from the allocator permits modular development of both allocators and garbage collectors. It is thus an object of the present invention to provide a conservative garbage collector which does not include heap management functions, but instead uses those provided by an allocator that is separate from the garbage collector.

SUMMARY OF THE INVENTION

The object of the invention is attained by providing a table, termed hereinafter a malloc table, which has a form that is defined by the garbage collector and that is used to transfer information about the heap between the allocator and the garbage collector. When garbage needs to be collected, the allocator builds the table and invokes the garbage collector, which uses the table in its mark phase to determine what blocks are not currently in use. In the sweep phase, the garbage collector uses the allocator's free function to return the blocks that are not in use to the free list. The garbage collector also uses the table in the mark phase to make a blacklist of potential blocks that are pointed to by false pointers and therefore should not be allocated by the allocator when the allocator next expands the heap. When the garbage collector returns, the allocator uses the blacklist to decide which of the blocks in the expanded portion of the heap may be added to the free list.

There are three kinds of information in the malloc table:
a current heap map that is made by the allocator; the current heap map indicates which of the blocks in the current heap are collectible, i.e., subject to garbage collection;

a mark list that is made by the garbage collector during the mark phase; the mark list indicates which of the collectible blocks in the current heap map are pointed to by apparent pointers in the address space of the process that is executing the allocator and garbage collector; and a blacklist that is made by the garbage collector during the mark phase; the blacklist indicates collectible potential blocks in an area into which the heap may expand which are pointed to by apparent pointers.

Various aspects of the invention include an allocator and a garbage collector that are adapted to make and use the malloc table, the malloc table itself, and methods involving the garbage collector, the allocator, and the malloc table. Other objects and advantages will be apparent to those skilled in the arts to which the invention pertains upon perusal of the following Detailed Description and drawing, wherein:

Figure 1:
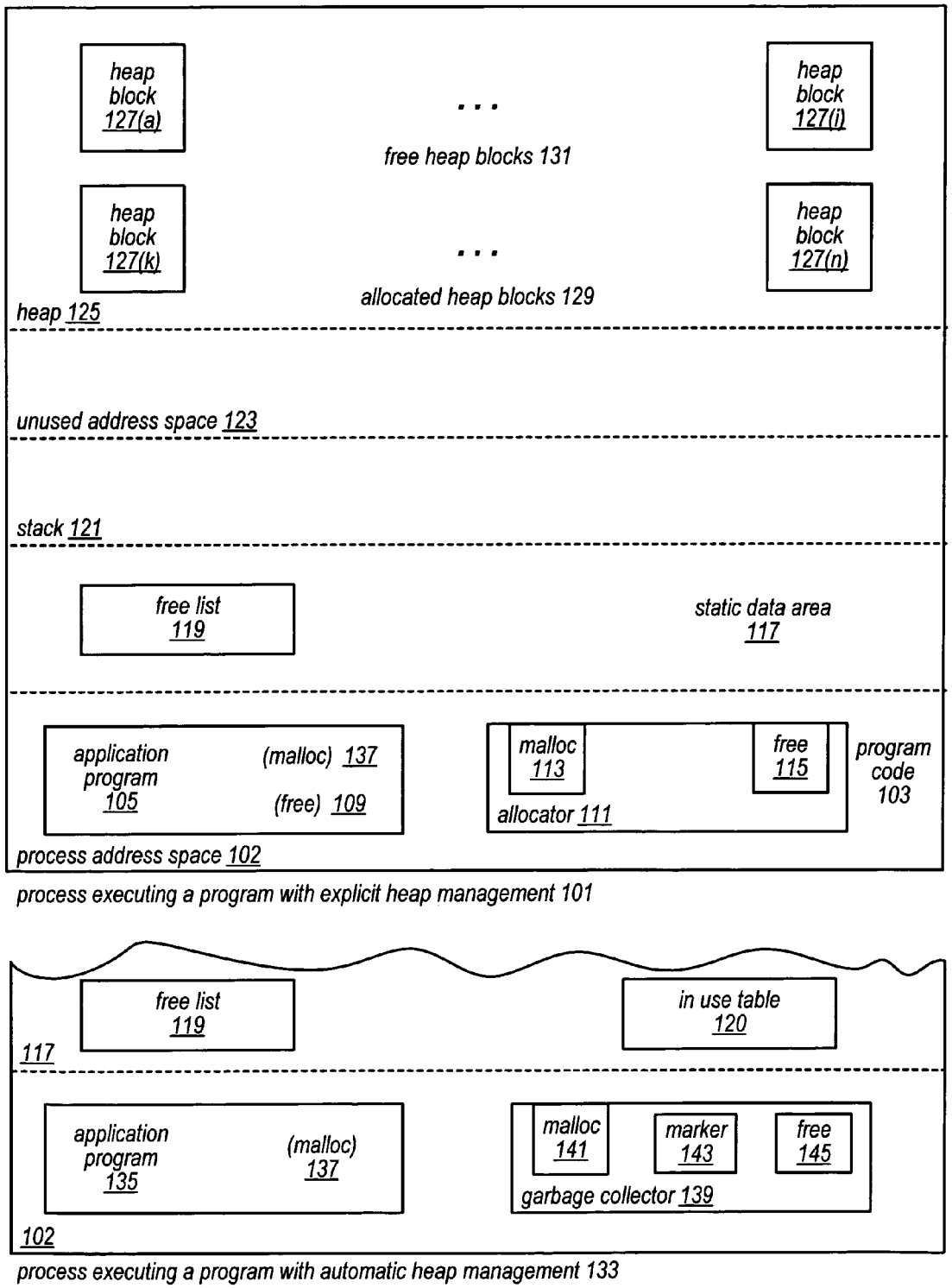
FIG. 1 is an overview of heap management using a prior-art allocator and heap management using a prior-art garbage collector.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will begin with a conceptual overview of a garbage collector which does not use its own heap management functions, but rather those of a separate allocator and will then provide a description of a preferred embodiment in which the separate allocator is Doug Lea's allocator.

Conceptual Overview

The reason why prior-art garbage collectors 139 have had their own heap management functions rather than use those provided by an allocator is that garbage collectors cannot function without detailed knowledge of the heap's structure and state; moreover, the efficiency of a conservative garbage collector is improved if blacklisted blocks are not allocated. Examples of the need for detailed knowledge are the following;

a garbage collector 139 cannot construct and use in use table 120 without detailed knowledge of the sizes and locations of heap blocks 127;

a garbage collector 139 cannot determine when garbage collection is necessary without detailed knowledge of the current state of the heap; and a garbage collector 139 cannot keep blacklisted blocks from being allocated if it does not itself do the allocation.

The problems that must be solved in building a garbage collector that is independent from an allocator and can use the allocator's heap management functions thus include the following:

- providing the garbage collector with the information about the heap that it needs to make in use table 120;
- finding a way of determining when the garbage collector should run; and
- finding a way of making sure that the allocator does not allocate blacklisted blocks.

Ideally, the solutions to these problems should be implementable in any allocator and should provide the garbage collector and allocator with the information in a form which is not dependent on the kind of allocator or the kind of garbage collector.

These problems are solved by modifying the allocator and the garbage collector as follows:

- the allocator determines from the state of the heap when garbage collection is necessary;
- when collection is necessary, the allocator builds a malloc table; the malloc table is used to pass information about the heap between the garbage collector and the allocator; as built by the allocator, it contains the information about the structure of the heap that the garbage collector needs to mark blocks 127 that are in use;
- when the malloc table is finished, the allocator invokes the garbage collector; in the mark phase, the garbage collector marks the malloc table to indicate which heap blocks 127 are in use or are blacklisted; in the sweep phase, the garbage collector uses the allocator's free function to free heap blocks that are not in use;
- when the garbage collector returns, the allocator uses the blacklist in the malloc table to determine which blocks should not be allocated because they are pointed to by false pointers.

Because the allocator invokes the garbage collector when garbage collection is required and provides the garbage collector with the information needed for in use table 120, the garbage collector need concern itself only with marking the heap blocks and freeing unused heap blocks and can use the allocator's free function to do the latter. Because the garbage collector modifies the malloc table to indicate blocks that blacklisted, the allocator can avoid allocating such blocks. Finally, the malloc table can have a standard form that can describe any heap, and consequently, it can be built and read by any allocator and the garbage collector can be used with any allocator that can build the standard malloc table and invoke the garbage collector.

Figure 2:
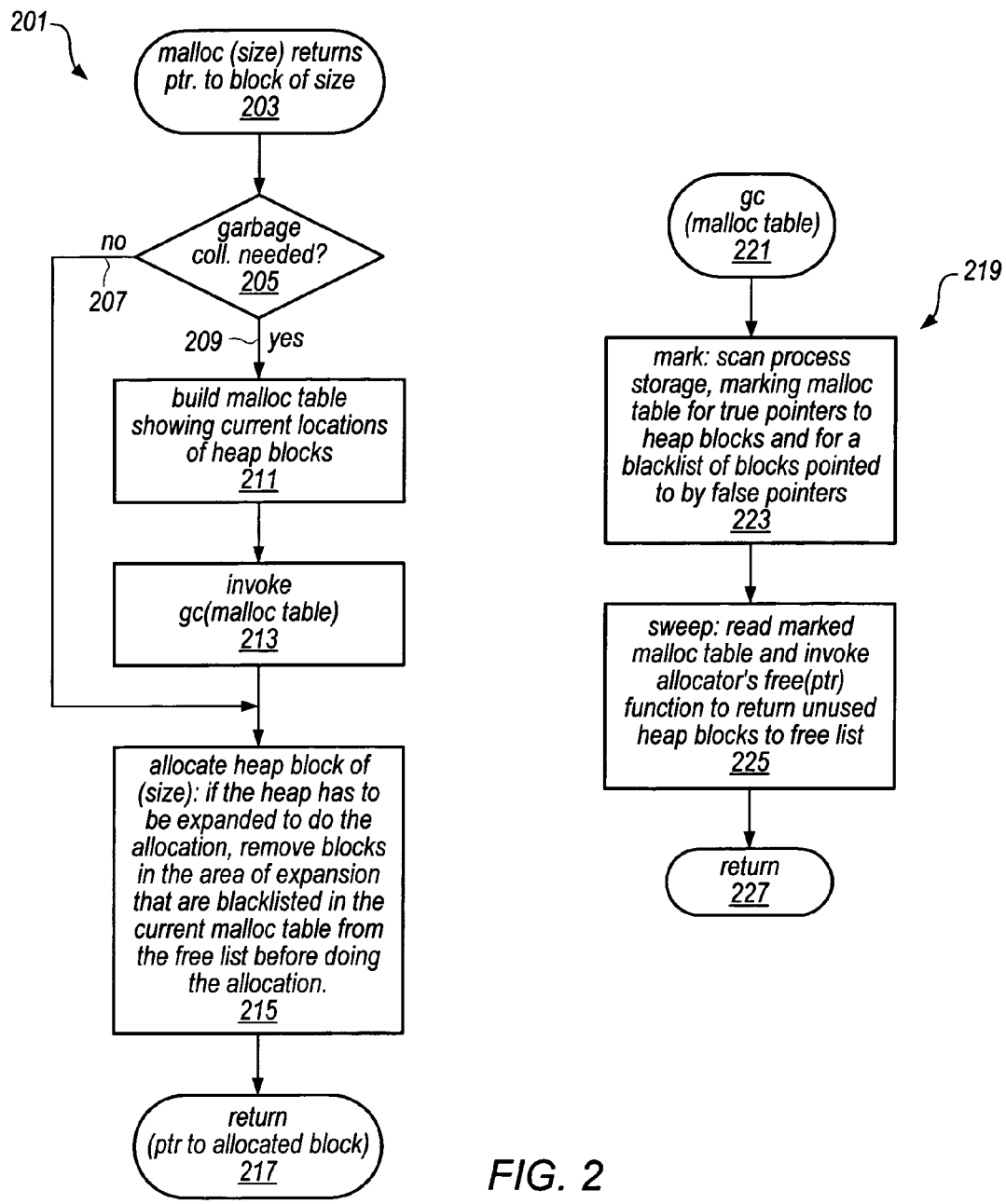
FIG. 2 is a flowchart showing the interaction between a garbage collector and an allocator where the garbage collection and allocation functions have been separated.

Interaction Between the Allocator and the Garbage Collector: FIG. 2

FIG. 2 is a high-level flowchart of the interaction between an allocator and a garbage collector that are built according to the principles just set forth. Flowchart 201 is a flowchart of the operation of the allocator's malloc function. As shown at start block 203, the function takes a size argument that specifies the size of the block to be allocated and returns a pointer to the new block. First, the function determines whether the state of the heap is such that garbage collection is needed (decision block 205). Heap states that require garbage collection will of course depend on the manner in which the heap is implemented and may also depend on parameters that are set when the heap is initialized. If no garbage collection is needed, malloc takes branch 207, removes a heap block of the size specified by size (215) from the free list, and returns a pointer to the newly-allocated block (217). If the allocation of the block requires an expansion of the heap, malloc uses the black list in the malloc table as last modified by the garbage collector to determine which blocks in the expanded area should be added to the free list.

If garbage collection is needed, malloc takes branch 209 and builds the malloc table (211); when the table is finished, it shows the locations of all blocks currently in heap 125. Then, malloc invokes the garbage collector (213); included in the invocation is a specifier for the location of the malloc table. When the garbage collector returns, garbage collection is finished. After the garbage collector returns, malloc allocates the block and returns the pointer (215,217).

Flowchart 219 is a high-level flowchart of the execution of the garbage collector. As shown at 221, the garbage collector is invoked with the location of the malloc table as an argument; then, the garbage collector enters the mark phase, in which it scans the process's storage for pointers, uses the malloc table for each pointer to determine whether the pointer is a pointer to the memory in a heap block, and marks the malloc table for the heap blocks specified by the pointers (223).

Because the garbage collector of the invention does not include heap management functions, it cannot directly use a blacklist when allocating blocks. What it does instead is make a blacklist during the mark phase and adds the blacklist to the end of the malloc table it received from the allocator. As shown at block 215 of flowchart 201, when the allocator expands the heap into an area of the process address space that includes blacklisted blocks, it does not place the blacklisted blocks on the free list.

Continuing with block 225, once the garbage collector has marked the malloc table and added the blacklisted blocks to it, it begins the sweep phase, in which it reads the marked malloc table up to the point where the added blacklist begins and uses the allocator's free function to free the unused blocks. The garbage collector then returns (227) and malloc continues as shown in flowchart 201.

Figure 3:
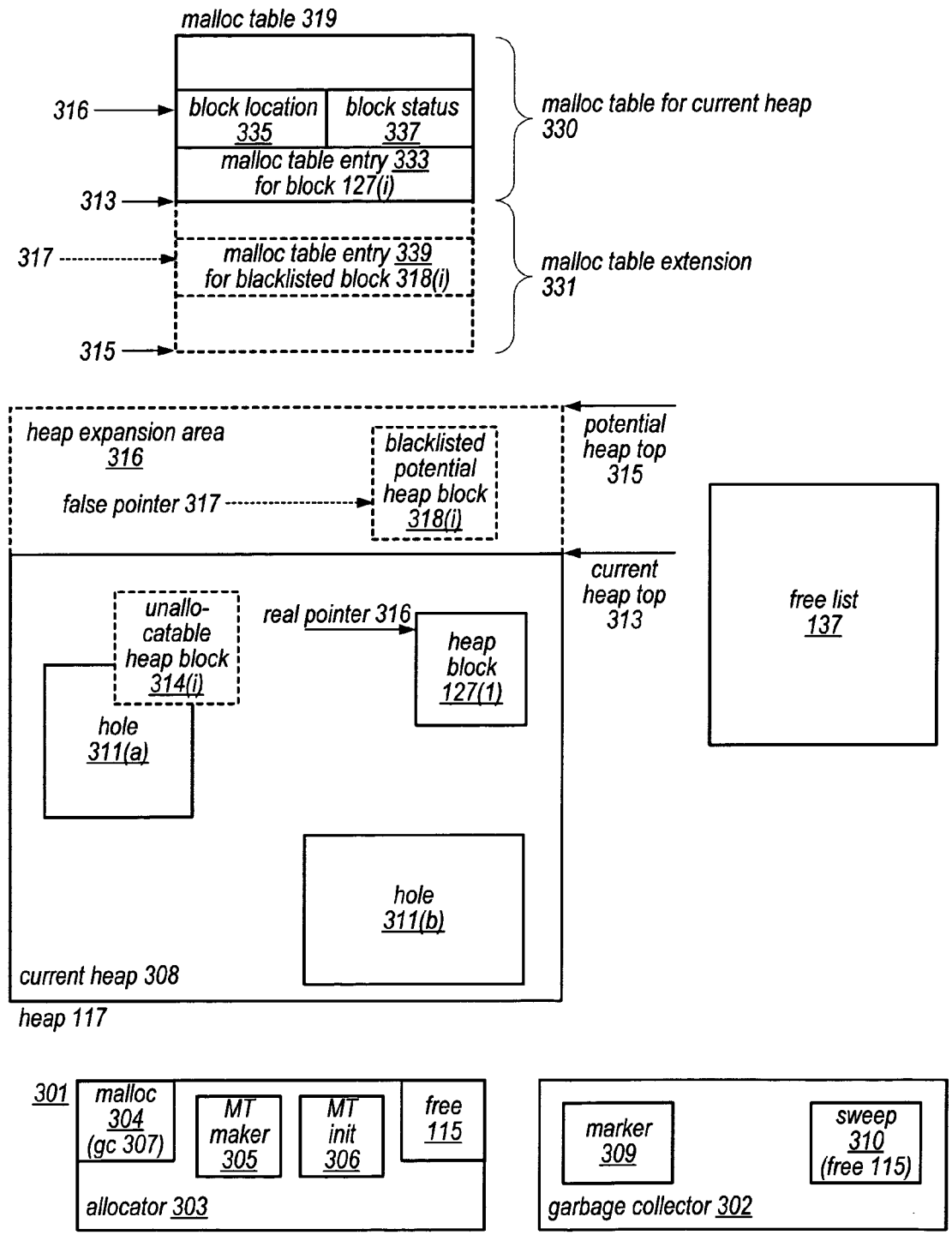
FIG. 3 is an overview of an allocator and garbage collector that interact as set forth in FIG. 2.

Components of the Allocator and Garbage Collector: FIG. 3

FIG. 3 is a high-level block diagram 301 of the components of an allocator and garbage collector that have been configured for the invention. Allocator 303 contains external malloc and free functions as before; malloc 304, however, operates as set forth in FIG. 2 and is consequently shown invoking garbage collector 302. Allocator 303 also includes two new internal functions: malloc table initializer 306, which initializes the malloc table at the beginning of execution of the process to which process address space 102 belongs, and malloc table maker 305, which malloc 304 uses to fill in the initialized malloc table before the allocator invokes the garbage collector. Garbage collector 302 contains an internal marker function 309 which marks the malloc table for in use blocks and the black list and an internal sweep function that reads the marked malloc table and uses the allocator's free function 115 to free unused heap blocks 127 by returning them to free list 137.

Heap 117 is shown in more detail than in FIG. 1. Heap 117 has two main parts: current heap 308, which contains all of the currently-allocated heap blocks 127, and heap expansion area 316, which allocator 303 may use if there are no more heap blocks available in current heap 308. In addition to heap blocks 127, heap 117 contains holes 311. These result when an application program 105 or a library routine invoked by application program 105 uses a function other than malloc 304 to allocate memory. If the allocated memory is in the area of the process address space that is otherwise occupied by heap 117, the result is "holes" in the heap. These holes are not under control of allocator 303, and blocks 127 which are in or overlap the holes should be neither allocated nor freed by allocator 303. These blocks may, however, contain pointers, and thus they must be examined in the garbage collector's mark phase. One of these unallocatable blocks is shown at 314(*i*). Also shown in heap 117 in FIG. 3 are a real pointer 316 pointing to a heap block 127(*i*) in the portion of the heap that is currently being managed by allocator 303, as is indicated by current heap top pointer 313, and a false pointer 317 pointing to a blacklisted potential heap block 318(*i*) in an area 316 of the process address space into which the heap may be expanded. The maximum possible extent of the heap is indicated by potential heap top pointer 315.

The malloc table is shown in overview at 319. There is a malloc table entry 333 for each heap block 127 in the current heap, including those which are in or overlap holes 311, and each potential heap block in heap expansion area 316. Malloc table 319 has area 330 corresponding to current heap 308 and 331 corresponding to heap expansion area 316. In each area, the entries are ordered by the location of the block 127 or 318 represented by the entry in process address space 102. Each malloc table entry contains two items of information: the location 335 of the heap block represented by the memory and the status 337 of the block represented by the entry. When malloc function 304 makes malloc table 319, it sets status in portion 330 of the malloc table to indicate whether a block 117 is unfreeable, either because it is in or overlaps a hole or because it is currently on the free list.

During the mark phase of garbage collection, marker function 309 sets the status of entries 333 for blocks 127 in current heap 308 to indicate whether the block may be freed during the sweep phase; with entries in extension 331 representing potential heap blocks 318, marker function 309 sets status 337 to indicate whether the block is on the blacklist. During the sweep phase, sweep function 310 uses free function 115 to return the blocks whose malloc table entries indicate that they may be freed to the free list. When malloc 304 extends heap 117, it does not place blocks whose entries in malloc table extension 331 indicate they are blacklisted on the free list.

Figure 4:
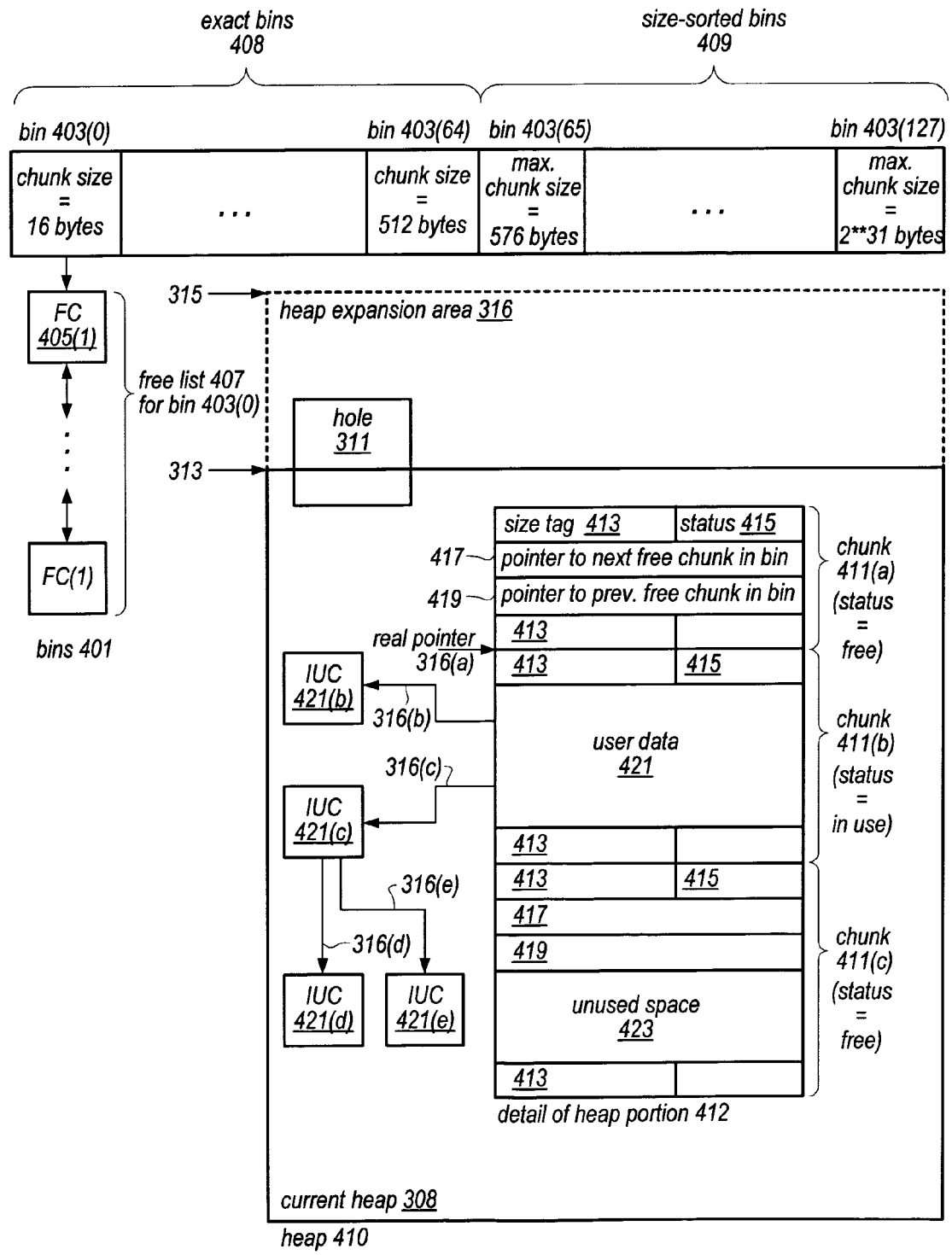
FIG. 4 shows details of the heap structures used in Doug Lea's allocator.
Figure 5:
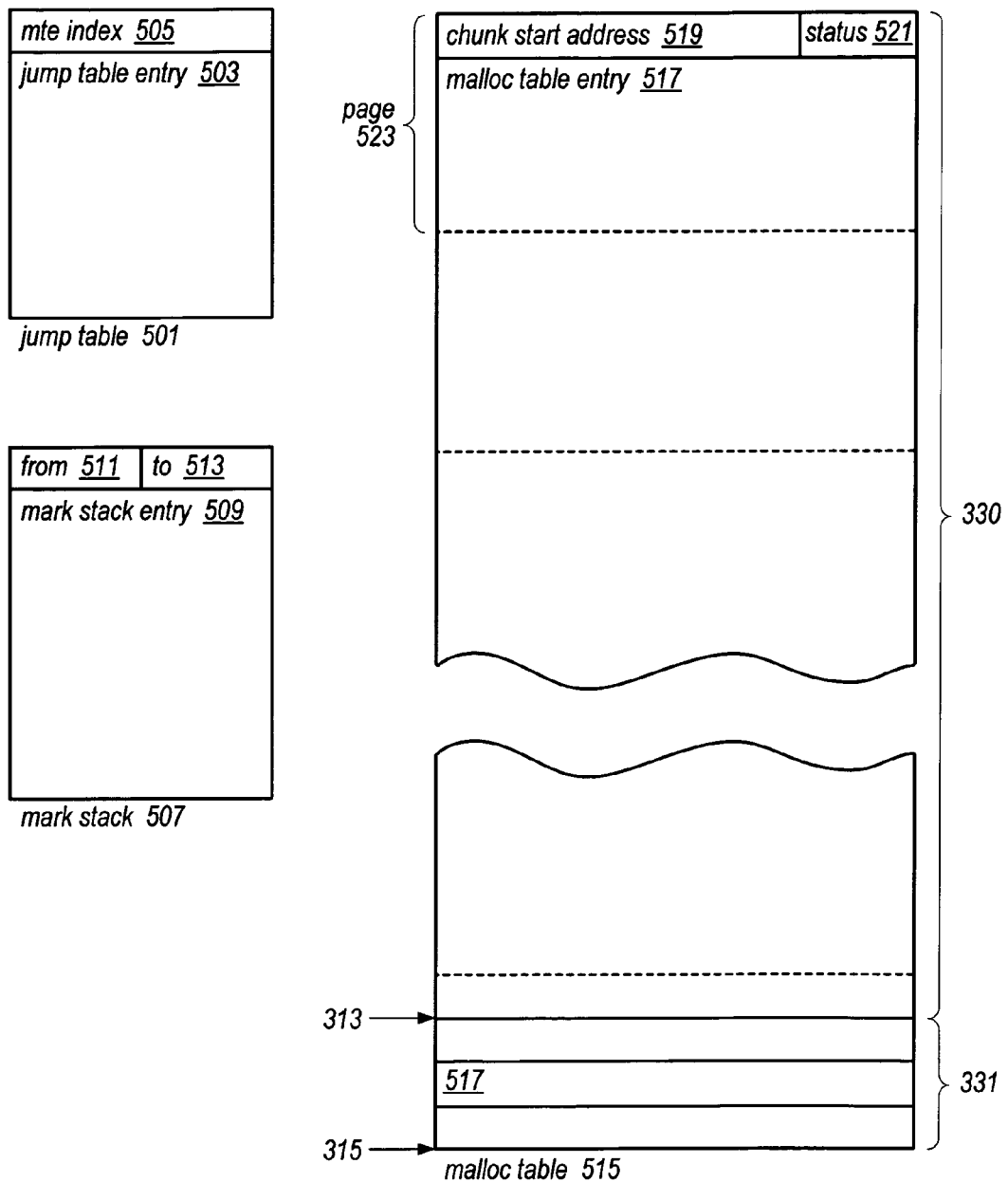
FIG. 5 shows details of the malloc and jump tables in a preferred environment.

An Implementation Using Doug Lea's Allocator: FIGS. 4 and 5

A preferred embodiment of the allocator and garbage collector of the invention has been made by modifying Doug Lea's allocator, called in the following Dl-malloc, so that its malloc function produces a malloc table, invokes a version of the Great Circle garbage collector which has been modified to read the malloc table and add a blacklist to it, and when the garbage collector returns, use the blacklist to avoid placing blocks pointed to by false pointers on the free list.

Heap Management Structures in DL-Malloc: FIG. 4

FIG. 4 is an overview of the structures which DL-malloc uses to manage its heap. The overview is based on the discussion in the A memory allocator reference cited earlier. Heap 410 is made up of chunks 411 which have sizes ranging from 16 bytes through $2^{31}$ bytes. The chunks are organized by size into 128 bins 403(00.127). The bins 408 with chunk sizes up to 512 bytes have fixed-size chunks; the bins 409 with chunk sizes 576 through $2^{31}$ bytes have chunks of varying sizes. Each bin has a free list 407 for the free chunks having the size specified for the bin; in the case of size-sorted bins 409, the chunks on the bin's free list are ordered by increasing size. The allocate function goes to the bin that will contain a chunk of the requested size and follows the bin's free list until it finds the first chunk that will accommodate the requested size. The allocated chunk has exactly the requested size. When a chunk in the heap is free and has a neighboring chunk that is free, Dl-malloc coalesces the chunk and the free neighbor and adds the coalesced chunk to the free list for the bin with the proper size.

A detail of a portion of heap 410 containing three chunks is shown at 412. Each chunk 411 has size tags 413 at the beginning and end of the chunk. The size tag gives the size of the chunk, and because there are size tags at both beginning and end, Dl-malloc can easily manipulate neighboring chunks, as is required to coalesce neighboring chunks. A status field 415 follows the top size tag; in the present context, there are three statuses of interest: FREE, IN_USE, and IS_EXTERNAL. The latter status indicates that the chunk is not under control of Dl-malloc, and consequently is part of a hole 311 in the heap. However, as already mentioned, the garbage collector must search such chunks for pointers. As shown at 411(*a*), a FREE chunk contains a pointer 417 to the next free chunk in its bin 403 and a pointer 419 to the preceding free chunk in its bin 403. The need to store these pointers puts a lower limit on the size of the chunks allocated by Dl-malloc. The pointers permit Dl-malloc to navigate in both directions along the free list. In an IN_USE chunk, the free list pointers are overwritten by user data 421, as shown with regard to chunk 411(*b*). Chunk 411(*c*) is larger than minimum-sized chunk 411(*a*); it contains the free list pointers and unused space 423.

Also shown in heap 410 are a number of in use chunks (IUC) 421 that are reachable by real pointers 316 from chunk 411(*b*). Real pointers 316(*b* and *c*) are part of user data 421 in chunk 411(*b*); real pointer 316(*b*) points to IUC 421(*b*); the user data in that chunk points to no further chunks. Real pointer 316(*c*) points to IUC 421(*c*), whose user data contains pointers 316(*d*), pointing to IUC 421(*d*), and 316(*e*), pointing to IUC 421(*e*). Any in use chunk 421 may of course be pointed to by any number of pointers, and the number of pointers the chunk may contain is limited only by its size.

The Malloc Table and Other Tables Used by the Garbage Collector: FIG. 5

FIG. 5 shows a preferred embodiment 515 of the malloc table. Malloc table 515 has the same general form as malloc table 319: it has a malloc table entry 517 for every chunk within the bounds of heap 410, including those contained in or overlapping holes 311. Malloc table entry 517 has two fields: the address 519 of the start of the chunk 411 represented by the entry and the status 521 of the chunk for the current garbage collection. In a preferred embodiment, there are three statuses of interest:

the chunk is UNCOLLECTIBLE, because the chunk represented by the entry has either the FREE status (i.e., is on a free list) or the IS_EXTERNAL status (i.e., is in or overlaps a hole 311);

the chunk is COLLECTIBLE and MARKED, i.e., during the mark phase, the garbage collector found a pointer that points to the chunk; or the chunk is COLLECTIBLE and UNMARKED; i.e., during the mark phase, the garbage collector did not find such a pointer.

The malloc table entries in table 515 are ordered by increasing chunk start address 519. Like malloc table 319, malloc table 515 is divided into the malloc table 330 for the current heap and malloc table extension 331 for heap expansion area 316. Malloc table 515 is also divided into a number of pages 523. Each page 523 contains malloc table entries 517 for a fixed range of start addresses 519; as will be explained in detail below, the division of malloc table 515 into pages speeds searches of the table.

Malloc function 304 builds malloc table 515 when the function determines that a garbage collection is necessary. In a preferred embodiment, the conditions under which malloc function 304 builds malloc table 515 and invokes garbage collector 304 are the following:

- there is not a chunk available in current heap 308 which malloc can use for the object it is to currently allocate; and
- the heap minus the estimated live memory remaining after the last garbage collection exceeds a certain percentage of the total heap.

If the latter condition is not true, malloc function 304 does not invoke the garbage collector, but merely extends the heap into heap expansion area 316, using the blacklisting information in the most recent malloc table's malloc table extension 331 to avoid placing chunks in the newly-extended heap that are pointed to by false pointers 317 on the free list. If the chunks that are added to the heap via the extension are still not enough to satisfy the allocation, then malloc function 304 adds all chunks in the extension that do not belong to holes 311 to the free lists in their respective bins.

When malloc table 515 is compared with heap 410, it is clear how the malloc function builds malloc table 515. Beginning at the lowest address in heap 410, the malloc function reads heap 410 chunk 411 by chunk, making a malloc table entry 517 for each chunk, including those which would be located in heap expansion area 316 if the heap were expanded. If additional malloc table entries 517 are needed, the malloc function adds them to malloc table 515. The entry contains the address of the start of the chunk. In making malloc table entries 517 for current heap 38, the malloc function sets status 521 as follows: if status 415 of the chunk indicates that the chunk's status is FREE or IS_EXTERNAL, status 521 is set to UNCOLLECTIBLE; if the chunk's status is IN_USE, status 521 is set to COLLECTIBLE and UNMARKED. If the malloc function reaches top 313 of the current malloc table before it is finished making entries, it increases top 313 as it adds entries. When a chunk is IS_EXTERNAL, the malloc function also pushes the start and end addresses of the chunk onto mark stack 507. This ensures that the garbage collector will search the holes 311 in heap 410 during the mark phase for pointers to chunks allocated by the malloc function.

When the malloc function has made entries for all of the chunks in current heap 308, it continues with the entries for potential chunks in heap expansion area 316. Since there are no real chunks corresponding to these malloc table entries, the malloc function uses a single size for all of the potential chunks. The malloc table entry for each of the chunks in heap expansion area 316 is set to COLLECTIBLE, ensuring that marker 309 will mark the malloc table entry 517 for the chunk if it is pointed to by a false pointer.

When the malloc function is finished building the malloc table, it builds jump table 501. The purpose of this table is to speed up the search of malloc table 515. Because the entries in malloc table 515 are ordered by increasing chunk start address 519, malloc table 515 may be searched by any method, such as a binary search, that can be used with an ordered set of values. With all such methods, however, the time taken for the search increases with the size of the set of values being searched. Jump table 501 determines which page 523 of malloc table 515 will have the malloc table entry 517 for the chunk pointed to by a pointer, so that only that page has to be searched, instead of the entire malloc table.

All pages 523 but the last have the same number of malloc table entries 517, and that number is a power of two. Jump table 501 has a jump table entry 503 for each page 523; the entry for the page contains the index of the first malloc table entry 517 in the page 523. The smaller the page size is, the faster the search, but the larger the jump table.

Mark stack 507 is used during the mark operation to keep track of chunks 411 which have been marked because the garbage collector found a pointer that pointed to the chunk 411, but which themselves have not yet been searched for pointers to other chunks. Each entry 509 in the mark stack contains the start address 511 and the end address 513 of a chunk. As mentioned above, the malloc function pushes a mark stack entry 509 onto mark stack 507 for every chunk 411 which is in or overlaps a hole 311.

Use of the Malloc Table, the Jump Table, and the Mark Stack by the Garbage Collector In the mark phase, marker 309 looks in the process's root data for data items that might be pointers to chunks that are already part of heap 410 or are in an area of memory that could become part of heap 410. Each such data item's value must, if taken as a pointer, point to a range of memory between the bottom of the heap and potential heap top 315. In the following, such data items will be termed apparent pointers. When marker 309 finds such a data item, it proceeds as follows: it first subtracts the heap base address from the apparent pointer, and then it right-shifts the result the number of bits that correspond to the log (page-523-size). The resulting number j is the index of the jump table entry 503 for the page 23 that contains the malloc table entry 517 for the chunk the pointer is pointing to. The jump table entry 503 specified by the index contains the index of the malloc-table where the search will start, and the next jump table entry 503 contains the index of the malloc table entry 517 where the search will end.

If the apparent pointer points to a chunk 411 that has an entry 517 in malloc table 515 (i.e., the apparent pointer is either pointing to a real chunk in current heap 308 or is pointing to a potential chunk in heap expansion area 316 and is therefore a false pointer 317), marker 309 examines the chunk's malloc table entry 517; if its status is UNCOLLECTIBLE, marker 309 gets the next apparent pointer. If its status is COLLECTIBLE and MARKED, marker 309 gets the next apparent pointer. If its status is COLLECTIBLE and UNMARKED, marker 309 sets its status to MARKED. If the apparent pointer points to a chunk in heap expansion area 316, it is a false pointer 317 and marker 309 then gets the next apparent pointer. If the apparent pointer is not a false pointer, marker 309 computes the bounds of the chunk, pushes the bounds onto mark stack 507, and then gets the next apparent pointer.

Then, when marker 309 is finished scanning the process's root data, it scans the heap chunks whose bounds have been pushed onto mark stack 507. These heap chunks include the chunks belonging to holes 311 whose bounds the malloc function pushed to mark stack 507 when it built malloc table 515, as well as the heap chunks whose bounds were pushed onto mark stack 507 by the marker function. The topmost entry 509 is popped from the stack and the chunk indicated by the entry is scanned; if any apparent pointer is found to a chunk whose malloc table entry 517 is in the COLLECTIBLE and UNMARKED state, marker 309 changes the chunk's state to COLLECTIBLE and MARKED. If the chunk is in current heap 308, marker 309 places the bounds for the chunk onto mark stack 507. Marker 309 continues in this fashion until mark stack 507 is empty. At this point, marker 309 has scanned the root data, the chunks belonging to holes in heap 410, and all chunks that are COLLECTIBLE and has marked all chunks that are pointed to by apparent pointers. If the marked chunk is in current heap 308, the marked chunk is in use; if it is in heap expansion area 316, it is blacklisted.

For example, if marker 309 has followed real pointer 316(a) to chunk 411(b) and chunk 411(b)) is as yet unmarked, marker 309 marks it and pushes its bounds onto mark stack 507.

Later, when marker 309 pops the bounds for chunk 411(b) from mark stack 507 and scans chunk 411(b), it finds real pointer 316(b); it follows real pointer 316(b) to IUC 421(b), marks malloc table entry 517 for that chunk, and pushes the bounds for RJC 421(b) onto mark stack 507; it does the same when it finds real pointer 316(c). When marker 309 later pops the mark stack entry 509 for IUC 421(b) from mark stack 507, it scans it but finds no further pointers to heap chunks, so no further entries are pushed onto mark stack 507. On the other hand, when marker 309 pops the mark stack entry 509 for IUC 421(c) and scans the chunk, it finds pointers 316(d) and (e) pointing respectively to IUC 421(d) and 421(e). For each of these chunks, it marks the chunk's entry in malloc table 515 and pushes an entry for the chunk onto mark stack 509. Marker 309 later processes each of these chunks as described for TUC 421(b).

In the garbage collector's sweep phase, sweep function 310 reads the portion 330 of malloc table 515 whose malloc table entries 517 represent heap chunks 411 in current heap 308. Each time sweep function 310 finds a malloc table entry 517 in portion 310 whose status is COLLECTIBLE and UNMARKED, it invokes allocator 303's free function to free the heap chunk 411 corresponding to that malloc table entry 517. When sweep function 310 has read all of the malloc table entries in portion 330, garbage collector 302 returns as shown in FIG. 2.

Whenever malloc function 304 extends heap 410 into heap expansion area 316, it reads the malloc table entries 517 in table portion 331 for the chunks in the portion of heap expansion area 316 into which heap 410 is being extended. If the malloc table entry 517 is UNMARKED, malloc function 304 places the chunk on a free list for a bin 409; if it is MARKED, malloc function 304 does not place the chunk on a free list, thus effectively blacklisting the chunk. When malloc function 304 next builds malloc table 515, the fact that the blacklisted chunks in the portion of heap expansion area 316 that was last added to current heap 308 are not on a free list means that their malloc table entries 517 have the COLLECTIBLE status; thus if they remain unmarked after the execution of marker function 309, they may be put on the free list.

Alternative Embodiments

While malloc table 515 is a single table in a preferred embodiment, it should be pointed out that the table contains three kinds of logically separate information:
 a current heap map that indicates the locations of all of the chunks 411 in current heap 308 and which of the chunks are subject to garbage collection; this map is made by malloc function 304 and provided to garbage collector 302;
 a mark list that indicates whether a chunk 411 in current heap 308 is in use; the mark list is made by marker 309 and used by sweep function 310 to determine which chunks 411 may be freed; and
 a blacklist that indicates whether a potential chunk in heap expansion area 316 has been blacklisted; the blacklist is made by marker 309 and used by malloc function 304 when it expands the heap into heap expansion area 316 to determine which of the chunks in the portion of area 316 into which the heap was expanded should be placed on the free list.

While there are important advantages to combining the three kinds of information into a single malloc table 515 that is passed between the garbage collector and the malloc function, other embodiments may implement one or more of the logical components as independent data structures.

Many other alternative embodiments are possible. In some embodiments, garbage collector 302 may do nothing but make the mark map, and in some cases, the blacklist, with malloc function 304 itself reading the logical mark table and freeing the chunks that are not in use. Moreover, the garbage collector and the allocator may execute in different threads of a process or in different processes altogether, with information being passed between them by whatever method is required by the architecture. In most implementations, the allocator and the garbage collector will both have access to the address space of the process whose heap is being managed, but even that is not necessary for the garbage collector, since all it needs to mark the malloc table is the values of pointers used by the process, not the actual pointers themselves. Finally, though the preferred embodiment employs a mark-sweep garbage collector, the techniques disclosed herein can be applied to any kind of conservative garbage collector, including mostly-copying garbage collectors as well.

Various optimizations of malloc table 515 are possible as well; the preferred embodiment uses the jump table to speed up the location of malloc table entries; other embodiments may use other techniques to optimize searches. In the preferred embodiment, the malloc function builds the entire malloc table each time it determines that a garbage collection is necessary; in other embodiments, the malloc function may reuse the last malloc table and only recompute entries for blocks whose status has changed since the last malloc table was made.

CONCLUSION

The foregoing Detailed Description has disclosed to those skilled in the relevant technologies how to make and use a conservative garbage collector and an allocator that use a malloc table to transfer the information between them that the garbage collector needs to detect unused heap blocks and the allocator needs to manage the heap in a way that increases the efficiency of the garbage collector. It has also disclosed the best mode presently known to the inventors of making and using their invention. However, as pointed out in the Detailed Description and as will be immediately apparent to those skilled in the relevant technologies, there are many ways other than the ones disclosed herein in which the principles of the invention can be implemented. To begin with, the manner in which a malloc table is built will depend both on the form of the malloc table and the structures that the allocator uses to manage the heap. Further, the information that is presently carried in a single malloc table may be carried in independent data structures; finally, the manner in which the heap management functions are divided between the allocator and the garbage collector may vary from implementation to implementation.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

The invention claimed is:

1. A system, comprising:
 a processor; and
 a memory coupled to the processor, wherein the memory stores program instructions executable by the processor to implement a memory manager comprising:
  a memory allocator; and
  a conservative garbage collector;
 wherein the memory allocator is configured to:
  allocate memory for objects within a heap on behalf of a process;
  generate a heap map comprising a plurality of heap map entries, wherein each heap map entry of the plurality of heap map entries includes an address of an object allocated within the heap; and
  provide the heap map to the conservative garbage collector; and
 wherein the conservative garbage collector is configured to:
  generate a mark list identifying one or more objects within the heap, wherein addresses of the one or more objects correspond to data values specified within an address space of the process, wherein said generating comprises using the heap map, wherein said generating the mark list includes:
   tracing memory comprising a global variable of the process to identify potential pointers to heap objects, wherein a data value specified in the global variable is identified as a potential pointer to a heap object if the data value represents a numeric quantity greater than or equal to a starting address of the heap and less than an ending address of the heap; and
   in response to identifying a potential pointer to a heap object, creating an entry in the mark list for the heap object pointed to by the potential pointer; and,
  free a given object previously allocated in the heap if the mark list indicates that an address of the given object does not correspond to a data value specified within the address space.

2. The system as recited in claim 1, wherein, in generating the mark list, the conservative garbage collector is further configured to:
 set a mark indicator associated with a particular heap map entry of the plurality of heap map entries to a particular value if the conservative garbage collector identifies a potential pointer within the address space of the process to the particular object whose address is included in the particular heap map entry.

3. The system as recited in claim 1, wherein, prior to providing the heap map to the conservative garbage collector, the memory allocator is configured to set a collectibility indicator associated with a particular heap map entry of the plurality of heap map entries to a particular value if a triggering condition is met, wherein the particular value indicates that the object is not collectible by the conservative garbage collector.

4. The system as recited in claim 3, wherein the triggering condition comprises a determination that the object whose address is included within the particular heap map entry overlaps with a hole in the heap, wherein the hole comprises a region of memory not managed by the memory allocator.

5. The system as recited in claim 3, wherein the triggering condition comprises a determination that memory corresponding to the object whose address is included within the particular heap map entry has been freed.

6. The system as recited in claim 1, wherein the heap map comprises a plurality of memory pages, wherein the memory allocator is further configured to
 generate a jump table comprising a plurality of jump table entries, wherein each jump table entry includes an index to a respective page of the heap map; and
 provide the jump table to the conservative garbage collector; and wherein in generating the mark list, the conservative garbage collector is further configured to use the jump table to look up objects in the heap map.

7. The system as recited in claim 1, wherein the conservative garbage collector is further configured to:
 generate a blacklist specifying one or more addresses of memory blocks within an unallocated memory region, wherein said addresses are specified as data values within an address space of the process; and
 provide the blacklist to the memory allocator.

8. The system as recited in claim 7, wherein the memory allocator is further configured to:
 receive the blacklist from the conservative garbage collector; and
 in response to a detection of a triggering condition indicating that the heap is to be expanded, expand the heap, wherein said expanding comprises selecting one or more additional memory blocks whose addresses are not specified in the blacklist, and including the one or more additional memory blocks in a free list of memory blocks of the heap.

9. The system as recited in claim 7, wherein the conservative garbage collector is further configured to append the blacklist to the heap map.

10. The system as recited in claim 1, wherein the memory allocator is implemented independently of the conservative garbage collector.

11. The system as recited in claim 10, wherein the conservative garbage collector is configured to invoke a function provided by the memory allocator to free the given object.

12. The system as recited in claim 1, wherein the memory allocator is further configured to:
 in response to a detection of a triggering condition, invoke an execution of the conservative garbage collector.

13. A computer-implemented method, comprising:
 allocating, at a memory allocator, memory for objects within a heap on behalf of a process;
 generating, at the memory allocator, a heap map comprising a plurality of heap map entries, wherein each heap map entry of the plurality of heap map entries includes an address of an object allocated within the heap; and
 providing the heap map to a conservative garbage collector;
 generating, at the conservative garbage collector, a mark list identifying one or more objects within the heap, wherein addresses of the one or more objects correspond to data values specified within an address space of the process, wherein said generating comprises using the heap map, and wherein said generating includes:
  tracing memory comprising a global variable of the process to identify potential pointers to heap objects, wherein a data value specified in the global variable is identified as a potential pointer to a heap object if the data value represents a numeric quantity greater than or equal to a starting address of the heap and less than an ending address of the heap; and in response to identifying a potential pointer to a heap object, creating an entry in the mark list for the heap object pointed to by the potential pointer; and, freeing, at the conservative garbage collector, a given object previously allocated in the heap if the mark list indicates that an address of the given object does not correspond to a data value specified within the address space.

14. The computer-implemented method as recited in claim 13, wherein said generating the mark list at the conservative garbage collector comprises:

setting a mark indicator associated with a particular heap map entry of the plurality of heap map entries if the conservative garbage collector identifies a potential pointer within the address space of the process to the particular object whose address is included in the particular heap map entry.

15. The computer-implemented method as recited in claim 13, further comprising:

prior to providing the heap map to the conservative garbage collector,
determining, at the memory allocator, whether a triggering condition has been met; and
in response to determining that the triggering condition has been met, the memory allocator setting a collectibility indicator associated with a particular heap map entry of the plurality of heap map entries to a value indicating that the particular object whose address is included in the particular heap map entry is not collectible by the conservative garbage collector.

16. The computer-implemented method as recited in claim 15, wherein the triggering condition comprises a determination that the object whose address is included within the particular heap map entry overlaps with a hole in the heap, wherein the hole comprises a region of memory not managed by the memory allocator.

17. The computer-implemented method as recited in claim 15, wherein the triggering condition comprises a determination that the object whose address is included within the particular heap map entry is an object whose memory has been freed.

18. The computer-implemented method as recited in claim 13, wherein the heap map comprises a plurality of memory pages, further comprising:

generating a jump table comprising a plurality of jump table entries, wherein each jump table entry includes an index to a respective page of the heap map; and providing the jump table to the conservative garbage collector;

wherein said generating the mark list at the conservative garbage collector comprises using the jump table to look up objects in the heap map.

19. The computer-implemented method as recited in claim 13, further comprising:

generating, at the conservative garbage collector, a blacklist specifying one or more addresses of memory blocks within an unallocated memory region, wherein said addresses are specified as data values within an address space of the process; and provide the blacklist to the memory allocator.

20. The computer-implemented method as recited in claim 19, further comprising:

receiving the blacklist at the memory allocator; and, in response to a detection of a triggering condition indicating that the heap is to be expanded, the memory allocator expanding the heap, wherein said expanding comprises selecting one or more additional memory blocks whose addresses are not specified in the blacklist, and including the one or more additional memory blocks in a free list of memory blocks of the heap.

21. The computer-implemented method as recited in claim 19, wherein said providing the blacklist to the memory allocator comprises appending the blacklist to the heap map.

22. The computer-implemented method as recited in claim 13, wherein said providing the heap map to the conservative garbage collector comprises:

invoking an execution of the conservative garbage collector from the memory allocator, wherein said invoking comprises passing the heap map as an input parameter to the conservative garbage collector.

23. A computer readable medium comprising program instructions, wherein the instructions are computer-executable to implement a memory manager comprising a memory allocator and a conservative garbage collector, wherein the memory allocator is configured to:

allocate memory for objects within a heap on behalf of a process;

generate a heap map comprising a plurality of heap map entries, wherein each heap map entry of the plurality of heap map entries includes an address of an object allocated within the heap; and provide the heap map to the conservative garbage collector; and wherein the conservative garbage collector is configured to:

generate a mark list identifying one or more objects within the heap, wherein addresses of the one or more objects correspond to data values specified within an address space of the process, wherein said generating comprises using the heap map, and wherein said generating includes:

tracing memory comprising a global variable of the process to identify potential pointers to heap objects, wherein a data value specified in the global variable is identified as a potential pointer to a heap object if the data value represents a numeric quantity greater than or equal to a starting address of the heap and less than an ending address of the heap; and in response to identifying a potential pointer to a heap object, creating an entry in the mark list for the heap object pointed to by the potential pointer; and, free a given object previously allocated in the heap if the mark list indicates that an address of the given object does not correspond to a data value specified within the address space.

24. The computer readable medium as recited in claim 23, wherein, in generating the mark list, the conservative garbage collector is further configured to:

set a mark indicator associated with a particular heap map entry of the plurality of heap map entries to a particular value if the conservative garbage collector identifies a potential pointer within the address space of the process to the particular object whose address is included in the particular heap map entry.

25. The computer readable medium as recited in claim 23, wherein, prior to providing the heap map to the conservative garbage collector, the memory allocator is configured to set a collectibility indicator associated with a particular heap map entry of the plurality of heap map entries to a particular value if a triggering condition is met, wherein the particular value indicates that the object is not collectible by the conservative garbage collector.

26. The computer readable medium as recited in claim 25, wherein the triggering condition comprises a determination that the object whose address is included within the particular heap map entry overlaps with a hole in the heap, wherein the hole comprises a region of memory not managed by the memory allocator.

27. The computer readable medium as recited in claim 25, wherein the triggering condition comprises a determination that memory corresponding to the object whose address is included within the particular heap map entry has been freed.

28. The computer readable medium as recited in claim 23, wherein the conservative garbage collector is further configured to:
   generate a blacklist specifying one or more addresses of memory blocks within an unallocated memory region, wherein said addresses are specified as data values within an address space of the process; and
   provide the blacklist to the memory allocator.

29. The computer readable medium as recited in claim 28, wherein the memory allocator is further configured to:
   receive the blacklist from the conservative garbage collector; and
   in response to a detection of a triggering condition indicating that the heap is to be expanded, expand the heap, wherein said expanding comprises selecting one or more additional memory blocks whose addresses are not specified in the blacklist, and including the one or more additional memory blocks in a free list of memory blocks of the heap.

30. The computer readable medium as recited in claim 28, wherein the conservative garbage collector is further configured to append the blacklist to the heap map.

31. The computer readable medium as recited in claim 23, wherein the memory allocator is implemented independently of the conservative garbage collector.

32. The computer readable medium as recited in claim 23, wherein the memory allocator is further configured to:
   in response to a detection of a triggering condition, invoke an execution of the conservative garbage collector.

33. The computer readable medium as recited in claim 23, wherein the heap map comprises a plurality of memory pages, wherein the memory allocator is further configured to
   generate a jump table comprising a plurality of jump table entries, wherein each jump table entry includes an index to a respective page of the heap map; and
   provide the jump table to the conservative garbage collector; and wherein in generating the mark list, the conservative garbage collector is further configured to use the jump table to look up objects in the heap map.

* * * * *